United States Patent
Liu et al.

(10) Patent No.: US 7,631,489 B2
(45) Date of Patent: Dec. 15, 2009

(54) STRATEGY FOR SELECTIVELY BYPASSING A DPF IN A HYBRID HCCI COMBUSTION ENGINE

(75) Inventors: Zhengbai Liu, Naperville, IL (US); Puning Wei, Naperville, IL (US)

(73) Assignee: International Engine Intellectual Property Company LLC, Warrenville, IL (US)

( * ) Notice: Subject to any disclaimer, the term of this patent is extended or adjusted under 35 U.S.C. 154(b) by 981 days.

(21) Appl. No.: 11/062,358

(22) Filed: Feb. 22, 2005

(65) Prior Publication Data

US 2006/0185353 A1    Aug. 24, 2006

(51) Int. Cl.
    *F01N 3/00* (2006.01)
(52) U.S. Cl. .............................. 60/285; 60/274; 60/287; 60/297; 60/311
(58) Field of Classification Search ................... 60/286, 60/297, 311, 274, 285, 287, 288, 295
    See application file for complete search history.

(56) References Cited

U.S. PATENT DOCUMENTS

| | | | |
|---|---|---|---|
| 6,233,927 B1 | 5/2001 | Hirota et al. | |
| 6,240,721 B1 | 6/2001 | Ito et al. | |
| 6,820,417 B2 * | 11/2004 | May et al. | 60/297 |
| 6,957,640 B1 * | 10/2005 | Liu et al. | 123/305 |
| 6,990,951 B1 * | 1/2006 | Liu et al. | 123/299 |
| 7,017,561 B1 * | 3/2006 | Liu et al. | 123/568.12 |
| 7,021,276 B2 * | 4/2006 | Liu et al. | 123/299 |
| 2006/0042233 A1 * | 3/2006 | Coleman et al. | 60/285 |

OTHER PUBLICATIONS

U.S. Appl. No. 10/874,668, filed Jun. 23, 2004, Liu et al.
U.S. Appl. No. 10/809,254, filed Mar. 25, 2004, Liu et al.
Wolters, P.; W. Salber; J. Geiger; M. Duesmann; and J. Dilthey, "Controlled Auto Ignition Combustion Process with an Electromechanical Valve Train," 2003 SAE World Congress, Detroit, MI, Mar. 3-6, 2003, Paper No. 2003-01-0032, SAE International, Warrendale, PA.
Vafidis, C., "The Application of an Electro-hydraulic VVA System on a Passengor Car C.R. Diesel Engine," ATA (Associacioni Tecnica De Automobile) Congress, Porto Cervo, Italy, Oct. 12-13, 2000, Paper No. 20A2011.

* cited by examiner

*Primary Examiner*—Thomas E Denion
*Assistant Examiner*—Diem Tran
(74) *Attorney, Agent, or Firm*—Jack D. Nimz; Jeffrey P. Calfa

(57) ABSTRACT

In a conventional diesel combustion mode, one or more cylinders (12) of an engine (10) is or are fueled to cause conventional diesel combustion in each such cylinder. The resulting exhaust gas is treated by a diesel particulate filter (36) in an exhaust system (34) before exiting the exhaust system. In an alternative diesel combustion mode, such as HCCI, one or more cylinders of the engine are fueled to create in each such cylinder an in-cylinder fuel-air charge that ignites by auto-ignition as the charge is increasingly compressed. Also a bypass valve (38) is opened so that the resulting exhaust gas bypasses the DPF as the exhaust gas passes through the exhaust system.

2 Claims, 2 Drawing Sheets

STRATEGY FOR SELECTIVELY BYPASSING A DPF IN A HYBRID HCCI COMBUSTION ENGINE

FIELD OF THE INVENTION

This invention relates generally to internal combustion engines, in particular engines that selectively operate in different combustion modes, such as a Homogeneous-Charge Compression-Ignition (HCCI) combustion mode and a Conventional Diesel (CD) combustion mode. The invention provides a strategy for selectively utilizing a diesel particulate filter (DPF) in the exhaust system to treat exhaust gases in accordance with the particular combustion mode in which the engine is operating.

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a substantially homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_x$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by scientists and engineers.

One aspect of HCCI seems to impose a limit on the extent to which it can provide drastically reduced tailpipe emissions of soot and $NO_x$. At higher engine speeds and larger engine loads, the rate of combustion is difficult to control. Consequently, known engine control strategies may utilize HCCI only at relatively lower speeds and smaller engine loads. At higher speeds and/or larger loads, the engine is fueled so that the fuel combusts by conventional diesel (CD) combustion.

The nature of a diesel engine and the commercial availability of fuel injection systems that can control fuel injection with great precision allow fuel to be injected as a series of individual injections during an engine cycle. Hence known fueling systems in diesel engines can serve to control injection of fuel for both CD combustion and HCCI combustion.

CD fuel injection during an engine cycle is sometimes described by its particular fueling pulses, such as pilot injection pulses, main injection pulses, and post-injection pulses. Any particular fuel injection process typically always comprises at least one main fuel injection pulse, with one or more pilot and/or post-injection pulses being optional possibilities.

Contemporary fuel injection systems allow injection pressure, injection rate, and injection timing to be controlled with high degrees of precision so that fuel can be injected into a cylinder in precise quantities at precise times during an engine cycle. That is why known fuel injection and associated processing systems can handle both CD and HCCI combustion. An engine that can operate selectively in a CD combustion mode and an HCCI combustion mode depending on factors such as speed and load is sometimes called a hybrid HCCI diesel engine.

Several pending U.S. Patent Applications of the inventors disclose engines, systems, and methods for operating diesel engines selectively in different combustion modes including HCCI and CD modes. Those inventions take advantage of the capabilities of known fuel injection and processing systems to control fuel injections in different ways depending on certain aspects of engine operation. Exactly how any particular fuel injection system will be controlled by an associated processing system in any given engine will depend on specifics of the engine, the fuel injection system, and the processing system.

Because a diesel engine that powers a motor vehicle runs at different speeds and loads depending on various inputs to the vehicle and engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

HCCI may be considered one of several alternative combustion processes for a compression ignition engine. Other processes that may be considered alternative combustion processes include Controlled Auto-Ignition (CAI), Dilution Controlled Combustion Systems (DCCS), and Highly Premixed Combustion Systems (HPCS).

By whatever name an alternative combustion system or process may be called, a common attribute is that fuel is injected into a cylinder well before TDC to form an air-fuel charge that is increasingly compressed until auto-ignition occurs near or at top dead center (TDC).

In order to comply with relevant tailpipe emission requirements relating to the soot content in diesel engine exhaust, it has been proposed to use a diesel particulate filter (DPF) to treat exhaust gases from a diesel engine. While a DPF can be an effective device for trapping soot in the exhaust so that the trapped soot does not escape to the surrounding atmosphere, a DPF requires regeneration from time to time to burn off the trapped soot. While some regeneration may occur naturally, regeneration typically has to be occasionally forced.

Forced regeneration involves transitioning the engine from running lean to running rich so as to create the conditions necessary for DPF regeneration. This transitioning influences not only various aspects of engine operation but also the performance of a vehicle being powered by the engine. Consequently, forced regeneration of a DPF may be sufficiently disruptive to normal engine and to vehicle operation to require the addition of various countermeasure strategies for attempting to make the regeneration process as transparent as possible to a driver of the vehicle.

SUMMARY OF THE INVENTION

It is believed that operation of a vehicle powered by a diesel engine could be improved if the engine could operate in ways that minimize these regeneration-induced disruptions and/or in ways that make the need to regenerate the DPF less frequent.

It is toward that objective that the present invention is directed.

Briefly, the invention comprises endowing a diesel engine with the ability to operate selectively in an alternative diesel (AD) combustion mode, such as HCCI combustion mode, and conventional diesel (CD) combustion mode, to treat the exhaust gases with a DPF when the engine is operating in CD mode, and to bypass the exhaust gases around the DPF when the engine is operating in the AD combustion mode.

It is known that HCCI combustion generates very low NOx and PM (particulate matter) emissions. When a diesel engine operates by HCCI combustion, it may be possible to meet certain tailpipe emissions requirements without an exhaust after-treatment system, such as a DPF. However, when engine load is high and/or engine speed is high, it is difficult to control HCCI combustion. Therefore as a practical matter, HCCI combustion can be used in only a limited portion of an engine's speed/load range, such as the area labeled HCCI in FIG. 2, which will be more fully described later.

The invention is embodied in a strategy that is programmed in an associated processing system to provide the selective combustion modes and to control bypassing of exhaust gases around a DPF.

One generic aspect of the present invention relates to a method of operating a compression ignition engine. The method comprises processing certain data to select between an alternate diesel combustion mode and a conventional diesel combustion mode.

When the result of the processing selects the conventional diesel combustion mode, one or more cylinders of the engine is or are fueled to cause conventional diesel combustion in each such cylinder. Also, the resulting exhaust gas is treated by a diesel particulate filter (DPF) in an exhaust system of the engine before exiting the exhaust system.

When the result of the processing selects the alternative diesel combustion mode, one or more cylinders of the engine are fueled to create in each such cylinder an in-cylinder fuel-air charge that ignites by auto-ignition as the charge is increasingly compressed. Also the resulting exhaust gas bypasses the DPF as the exhaust gas passes through the exhaust system.

Another generic aspect of the invention relates to a compression ignition engine comprising a control system for processing data, one or more combustion chambers, a fueling system for injecting fuel into the one or more combustion chambers, and an exhaust system comprising a diesel particulate filter (DPF) and a bypass in parallel flow relationship to the DPF.

The control system controls the fueling system and the exhaust system using a result of the processing of certain data by the control system to select between an alternate diesel combustion mode and a conventional diesel combustion mode.

When the result of the processing selects the conventional diesel combustion mode, the control system causes the fueling system to fuel one or more cylinders of the engine for causing conventional diesel combustion in each such cylinder, and causes the resulting exhaust gas to flow through the DPF and not the bypass before exiting the exhaust system.

When the result of the processing selects the alternative diesel combustion mode, the control system causes the fueling system to fuel one or more cylinders to create in each such cylinder an in-cylinder fuel-air charge that ignites by auto-ignition as the charge is increasingly compressed, and causes the resulting exhaust gas to flow through the bypass and not the DPF as the exhaust gas passes through the exhaust system.

Still another generic aspect relates to a compression ignition engine comprising a control system for processing data, one or more combustion chambers, a fueling system for injecting fuel into the one or more combustion chambers, and an exhaust system comprising a diesel particulate filter (DPF), bypass in parallel flow relationship to the DPF, and a control valve for selectively controlling flow through the DPF and the bypass.

The control system controls the fueling system and the exhaust system using a result of the processing of certain data by the control system to select between an alternate diesel combustion mode and a conventional diesel combustion mode.

When the result of the processing selects the conventional diesel combustion mode, the control system causes the fueling system to fuel one or more cylinders of the engine for causing conventional diesel combustion in each such cylinder, and causes the control valve to allow exhaust gas to flow through the DPF.

When the result of the processing selects the alternative diesel combustion mode, the control system causes the fueling system to fuel one or more cylinders to create in each such cylinder an in-cylinder fuel-air charge that ignites by auto-ignition as the charge is increasingly compressed, and causes the control valve to allow exhaust gas to flow through the bypass.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE PREFERRED EMBODIMENT

Figure 1:
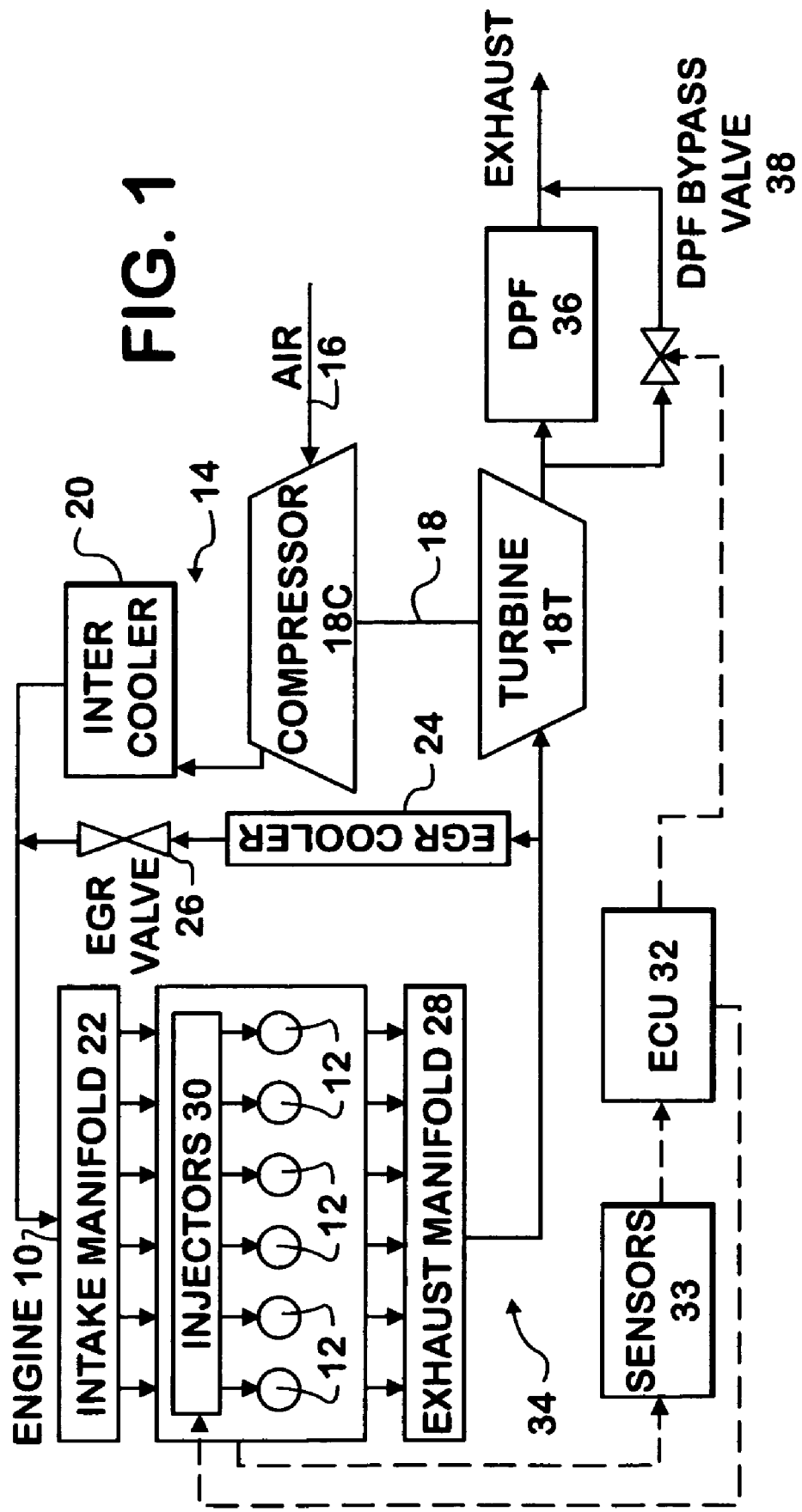
FIG. 1 is a general schematic diagram of portions of an exemplary diesel engine relevant to principles of the present invention.

FIG. 1 shows a portion of an exemplary diesel engine 10 operating in accordance with the inventive strategy for powering a motor vehicle. Engine 10 comprises cylinders 12 within which pistons reciprocate. Each piston is coupled to a respective throw of a crankshaft by a corresponding connecting rod. Intake air is delivered to each cylinder through an intake system 14.

Intake system 14 comprises a fresh air inlet 16 to a compressor 18C of a turbocharger 18. After it has been compressed by compressor 18C, the fresh air is cooled by an intercooler 20 before passing to an intake manifold 22. Air enters a respective cylinder 12 when a respective intake valve or valves at the cylinder is or are open.

For emission control, engine 10 has an exhaust gas recirculation (EGR) system that comprises an EGR cooler 24 and an EGR valve 26. When EGR valve 26 is open, exhaust gases are recirculated to intake manifold 22 from an exhaust manifold 28, with cooler 24 cooling the hot exhaust gases before recirculation.

Engine 10 has a fueling system that comprises fuel injectors 30 for cylinders 12. The engine also has a processor-based engine control unit (ECU) 32 that processes data from various sources to develop various control data for controlling various aspects of engine operation, one of the control functions being control of EGR valve 26.

The data processed by ECU 32 may originate at external sources, such as various sensors, 33 generally, and/or be generated internally. Examples of data processed may include engine speed, intake manifold pressure, exhaust manifold pressure, fuel injection pressure, fueling quantity and timing, mass airflow, and accelerator pedal position.

ECU 32 controls the injection of fuel into cylinders 12 by controlling the operation of the fueling system, including controlling the operation of fuel injectors 30. The processing system embodied in ECU 32 can process data sufficiently fast to calculate, in real time, the timing and duration of device actuation to set both the timing and the amount of each injection of fuel into a cylinder. Such control capability is used to implement the hybrid HCCI fueling strategy.

Engine 10 comprises an exhaust system 34 that in addition to exhaust manifold 28 comprises a turbine 18T of turbocharger 18 and one or more exhaust treatment devices that include at least a DPF 36 for trapping soot in the exhaust so that the trapped soot does not escape to the surrounding atmosphere.

From time to time, DPF 36 requires regeneration to burn off the trapped soot with regeneration typically involving transitioning the engine from the usual lean running of a diesel engine to running rich in order to create the conditions necessary for DPF regeneration. This transitioning is accomplished at least in part by the ECU's control of the fueling system.

In accordance with certain principles of the invention, a bypass valve 38 is connected in parallel flow relationship to DPF 36. Bypass valve 38 is controlled by ECU 32 selectively to allow flow through itself when operated open and to disallow flow through itself when operated closed.

Figure 2:
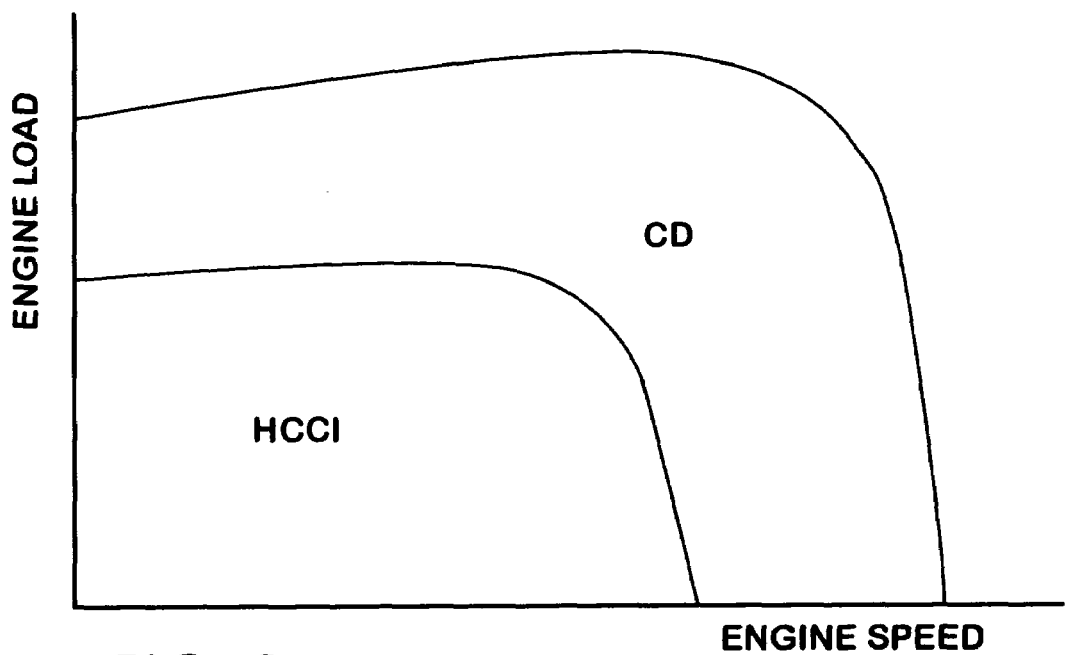
FIG. 2 is a representative graphic portrayal of known fueling strategy comprising HCCI combustion for some speed-load conditions and CD combustion for other speed-load conditions.

FIG. 2 is a graph whose vertical axis represents engine load and whose horizontal axis represents engine speed. At the origin of the graph, engine load is zero, and engine speed is zero. Respective solid lines demarcate two zones labeled HCCI and CD. The area marked HCCI covers a portion of the speed/load range for engine 10 that encompasses various combinations of relatively smaller engine loads and relatively lower engine speeds. The area marked CD covers a portion that encompasses various combinations of relatively larger engine loads and relatively higher engine speeds.

When engine 10 is operating at a speed and load that falls within area HCCI, fuel is injected into engine cylinders 12 in a manner that creates HCCI combustion. When engine 10 is operating at a speed and load that falls within area CD, fuel is injected into cylinders 12 in a manner that creates CD combustion.

Regardless of how data values for engine speed and engine load are developed, ECU 32 uses instantaneous engine speed and instantaneous engine load to select the particular mode for the engine, either the HCCI mode for creating HCCI combustion or the CD mode for creating CD combustion, and to then operate the fueling system to fuel the engine according to the strategy of the selected mode.

Figure 3:
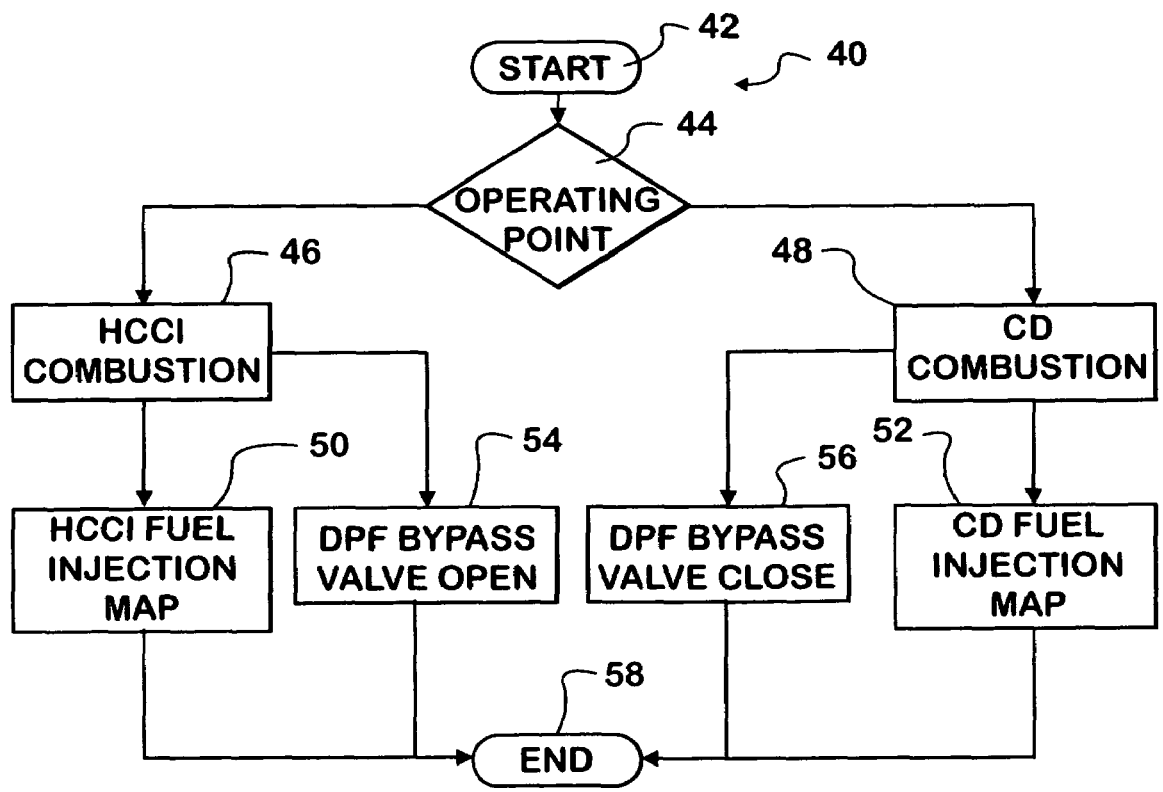
FIG. 3 is a flow diagram illustrating an embodiment of the inventive strategy.

FIG. 3 shows a flow diagram 40 for the inventive strategy as executed by the processing system of ECU 32. The processing system comprises an algorithm that iterates at a suitable execution rate to set the particular combustion mode beginning at a start 42. A step 44 processes engine speed data and engine load data to determine a corresponding operating point in FIG. 2, setting the combustion mode to either HCCI or CD depending on the particular location of the load/speed operating point.

If step 44 determines that the operating point is in area HCCI, then the HCCI combustion mode is selected (step 46). If step 44 determines that the operating point is in area CD, then the CD combustion mode is selected (step 48).

Selection of HCCI combustion mode causes the engine to be fueled using a fuel injection map, or maps, 50 that result in HCCI combustion. Selection of CD combustion mode causes the engine to be fueled using a fuel injection map, or maps, 52 that result in CD combustion.

For sufficiently low generation of diesel soot that characterizes HCCI combustion, use of DPF 36 can be avoided in the HCCI combustion mode. Consequently, the selection of HCCI combustion 46 by step 44 also causes ECU 32 to issue a command (step 54) that opens bypass valve 38 so that exhaust flow is shunted away from DPF 36 to pass through it rather than through DPF 36.

The selection of CD combustion by step 48 causes ECU 32 to issue a command (step 56) that closes bypass valve 38 so that exhaust flow is now constrained to pass through DPF 36. At the end 58 of an iteration of the algorithm, the particular selection that has been made is maintained until the next iteration.

The invention is beneficial to a hybrid diesel engine because the resistance that the DPF presents to exhaust flow is removed during engine operation in an AD mode when soot content in exhaust gas is sufficiently low that the DPF accomplishes at most a marginal reduction in tailpipe out soot, and the resulting reduction in backpressure on the engine enables the engine to operate with better fuel efficiency.

The HCCI phase may have one or more discrete injections. The CD phase may also have one or more discrete injections. The invention may be used in engines of various sizes including heavy-duty, medium-duty, and light-duty diesel engines. The algorithm for the invention can be implemented in the processor, provided that the processor has sufficient capacity. The only additional device required is the bypass valve and appropriate connections with the engine.

Although the opening and closing of bypass valve 38 has been described above with reference to the two distinct areas marked in FIG. 2, it should be appreciated that it may be appropriate to close valve 38 in some portion of an HCCI area while the engine continues to operate in HCCI mode.

While a presently preferred embodiment of the invention has been illustrated and described, it should be appreciated that principles of the invention apply to all embodiments falling within the scope of the following claims.

What is claimed is:

1. A method of operating a compression ignition engine comprising:
   processing certain data to select between an alternate diesel combustion mode and a conventional diesel combustion mode, and
   a) when the result of the processing selects the conventional diesel combustion mode, fueling one or more cylinders of the engine to cause conventional diesel combustion in each such cylinder, and causing the resulting exhaust gas to be treated by a diesel particulate filter (DPF) in an exhaust system of the engine before exiting the exhaust system, and b) when the result of the processing selects the alternative diesel combustion mode, fueling one or more cylinders of the engine to create in each such cylinder an in-cylinder fuel-air charge that ignites by auto-ignition as the charge is increasingly compressed, and causing the resulting exhaust gas to bypass the DPF as the exhaust gas passes through the exhaust system; wherein the step of causing exhaust gas resulting from conventional diesel combustion to be treated by the DPF comprises closing a bypass that is in parallel flow relationship to the DPF in the exhaust system.

2. A method of operating a compression ignition engine comprising:

processing certain data to select between an alternate diesel combustion mode and a conventional diesel combustion mode, and a) when the result of the processing selects the conventional diesel combustion mode, fueling one or more cylinders of the engine to cause conventional diesel combustion in each such cylinder, and causing the resulting exhaust gas to be treated by a diesel particulate filter (DPF) in an exhaust system of the engine before exiting the exhaust system, and b) when the result of the processing selects the alternative diesel combustion mode, fueling one or more cylinders of the engine to create in each such cylinder an in-cylinder fuel-air charge that ignites by auto-ignition as the charge is increasingly compressed, and causing the resulting exhaust gas to bypass the DPF as the exhaust gas passes through the exhaust system; wherein the step of causing exhaust gas resulting from alternative diesel combustion to bypass the DPF comprises opening a bypass that is in parallel flow relationship to the DPF in the exhaust system.

* * * * *